United States Patent [19]

Cass et al.

[11] Patent Number: 5,684,885
[45] Date of Patent: Nov. 4, 1997

[54] BINARY GLYPH CODES BASED ON COLOR RELATIONSHIPS

[75] Inventors: Todd A. Cass, San Francisco; David H. Marimont, Palo Alto, both of Calif.

[73] Assignee: Xerox Corporation, Stamford, Conn.

[21] Appl. No.: 534,521

[22] Filed: Sep. 27, 1995

[51] Int. Cl.⁶ ............................................. G06K 9/00
[52] U.S. Cl. ...................... 382/100; 382/162; 235/469
[58] Field of Search ............................... 382/100, 112, 382/162, 165, 166, 232; 235/465, 469, 494; 283/72, 114; 380/9, 54

[56] References Cited

U.S. PATENT DOCUMENTS

| | | | |
|---|---|---|---|
| 3,176,141 | 3/1965 | Siegemund | 250/219 |
| 3,196,393 | 7/1965 | Siegemund | 340/146.3 |
| 3,938,088 | 2/1976 | Clark | 340/146.3 B |
| 4,488,679 | 12/1984 | Bockholt et al. | 235/469 |
| 4,656,345 | 4/1987 | Kurimoto | 235/472 |
| 5,083,816 | 1/1992 | Folga et al. | 283/81 |
| 5,091,966 | 2/1992 | Bloomberg et al. | 382/21 |
| 5,221,833 | 6/1993 | Hecht | 235/494 |
| 5,245,165 | 9/1993 | Zhang | 235/454 |
| 5,291,243 | 3/1994 | Heckman et al. | 355/201 |
| 5,315,098 | 5/1994 | Tow | 235/494 |
| 5,369,261 | 11/1994 | Shamir | 235/469 |

FOREIGN PATENT DOCUMENTS 63-254586  10/1988  Japan ................... G06K 7/10

OTHER PUBLICATIONS

Network and Internetwork Security Principles and Practice by William Stallings, Ph.D (1995) pp. 27–28; 452; 456. IEEE Press.

Primary Examiner—Andrew Johns
Attorney, Agent, or Firm—Robert Hutter

[57] ABSTRACT

Binary digital data is rendered on a surface, such as a sheet of paper, by printing a series of color patches on the sheet, with the 1 bits rendered as color patches of a first color and the 0 bits rendered as color patches of the second color. The color patches are arranged in a predetermined order along an axis on the surface. The second color relates to the first color by a fixed relationship in color space, whereby the absolute values of the first and second colors are immaterial to a detecting apparatus. The color patches can be intermixed with areas of a third color, the third color representing an average in color space of the first color and the second color.

8 Claims, 3 Drawing Sheets

BINARY GLYPH CODES BASED ON COLOR RELATIONSHIPS

The following U.S. patents, all assigned to the assignee of the present invention, are hereby incorporated by reference: U.S. Pat. Nos. 5,091,966; 5,221,833; 5,245,165; and 5,315,098.

The present invention relates to techniques for embedding machine-readable digital data in printed color images. More particularly, the present invention relates to encoding digital data, such as binary data, by varying the relative positions in color space of small color patches placed on printed hard-copy images.

Creating marks on substrates, such as paper sheets, which are particularly suitable to be read by a machine is a well-known concept. A common embodiment of machine-readable printed matter is the familiar "bar-codes" seen in retail stores. Another type of machine-readable printed matter is known as "glyphs" or "data glyphs." General descriptions of data glyphs are given in a number of patents assigned to Xerox Corporation, which are incorporated by reference above. Under the glyph concept, digital information in the form of binary 1's and 0's are rendered in the form of very small linear marks. Generally, each small mark represents a digit of binary data; whether the particular digit is a digital 1 or 0 depends on the linear orientation of the particular mark. For example, in one embodiment, marks which are oriented from top left to bottom right may represent a 0, while marks oriented from bottom left to top right may represent a 1. The individual marks are of such a size relative to the maximum resolution of a printing device so that, when a large number of such marks are printed together on paper, the overall visual effect to a casual observer is of a mere gray halftone area. Only by very close optical scrutiny would a person be aware that the small dots forming the gray halftone area are indeed a series of small marks which together bear binary data. Briefly, an advantage of using data glyphs instead of bar-codes is that data glyphs can be provided unobtrusively, or even surreptitiously, in regular documents, such as checks or invoices.

With the increasing popularity of color printers in everyday office environments, along with increasing sophistication and improved resolution of scanning equipment for converting hard-copy original images into digital data, there is now an opportunity to apply the data glyph concept to color printed documents in a manner which advantageously leverages the particular capabilities of color printing and scanning equipment.

In the prior art, in addition to the above-identified patents relating generally to data glyph technology, U.S. Pat. No. 4,656,345 discloses a bar-code apparatus which includes special modification for bar-codes which are printed in different colors, as opposed to the standard black bars on white background.

U.S. Pat. No. 5,083,816 discloses a bar-code system wherein the bar-code labels are capable of being either machine-read or human-read. In addition to the machine-readable bar code on each label, the human-readable characters contained on the label have a background color for each digit which is different for each digit of the human readable message.

U.S. Pat. No. 5,291,243 discloses a system for printing security documents which have a copy detection or tamper resistant in plural colors. The described method includes electronic generation of a safety background image pattern with first and second interposed color patterns. The color patterns are preferably oppositely varying density patterns of electronically generated pixel dot images with varying spaces therebetween. The optical effects created by the color patterns are particularly detectable by copy detection or tamper resistance systems.

U.S. Pat. No. 5,369,261 discloses an information encoding system which employs printing color areas in the form of bars or checkerboard matrices of colored dot regions, with each colored region being variable as to both color and intensity. In one embodiment, superpixel dots have differently colored sub-regions within them, arranged with side-by-side colors or with colored regions stacked one on top of the other, such that information from one dot has as many color variables as there are stacked layers or mixed colors.

According to one aspect of the present invention, there is provided a method of creating a document bearing digital information on a surface, the digital information comprising bits in a first state and bits in a second state arranged in a predetermined relative order. Each bit of the digital information is assigned to one of a set of small areas on the surface, the small areas being regularly spaced along an axis on the surface. The bits are assigned to the small areas along the axis in the predetermined relative order. For each bit in the first state, a color patch of a first color is printed in the assigned small area. For each bit in the second state, a color patch of a second color is printed in the assigned small area. The color patches are printed contiguously on the surface along the axis.

According to another aspect of the present invention, there is provided a method of creating a document bearing digital information on a surface, the digital information comprising bits in a first state and bits in a second state arranged in a predetermined relative order. Each bit of the digital information is assigned to one of a set of small areas on the surface, the small areas being regularly spaced along an axis on the surface. The bits are assigned to the small areas along the axis in the predetermined relative order. For each bit in the first state, a color patch of a first color is printed in the assigned small area. For each bit in the second state, a color patch of a second color is printed in the assigned small area. A color patch of a third color is printed on the surface, the third color being located in color space on a vector between the first color and the second color.

According to another aspect of the present invention, there is provided a method of reading a document bearing digital information on a surface, the digital information comprising color patches regularly spaced along an axis on the surface, the color patches comprising color patches of a first color and color patches of a second color, arranged along the axis in a predetermined relative order. Local concentrations of pixel areas of the first color are detected in the document. A location of the first color in color space is determined. A location of the second color in color space is determined, the second color being of a second predetermined relationship in color space with the first color. Local concentrations of pixel areas of the second color are detected in the document. Spatial relationships are determined in the document, of the local concentrations of pixel areas of the first color and the local concentrations of pixel areas of the second color. Binary data is derived from the spatial relationships of the local concentrations of pixel areas of the first color and the local concentrations of pixel areas of the second color.

Figure 1:
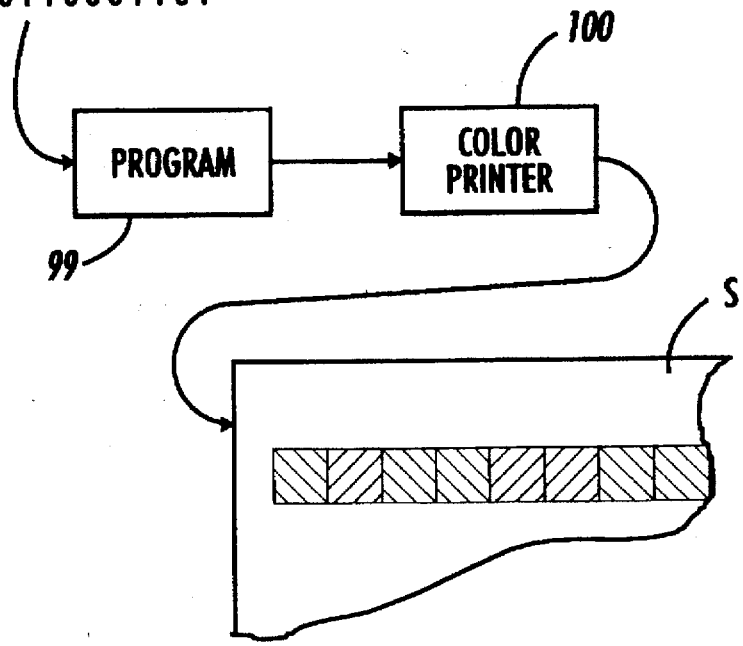
FIG. 1 is a simplified systems diagram showing the basic operation of printing color data glyphs according to the present invention.

FIG. 1 is a simple systems diagram showing the basic technique of rendering binary digital data according to the present invention. A stream of binary data to be stored on a surface, such as on a sheet of paper, is in the form of a series of 1 bits and 0 bits. As is well known, the meaning of a particular set of binary data is derived from the relative positions of 1's and 0's in a stream. For example, within each 8-bit byte in the data stream, the particular combination of 1's and 0's can be interpreted by external means as representing an ASCII character, or be assigned some other meaning as is known in the art.

According to the present invention, a stream of binary data desired to be rendered on a hard-copy sheet is fed through a control program 99 which controls a color printer 100, as shown. The color printer is capable of creating small marks of predetermined desired color in small areas on a substrate such a sheet of paper. According to one aspect of the present invention, the binary data stream such as that illustrated is in effect translated into a sequence of small colored areas on a sheet S. As shown in FIG. 1, the relatively heavy cross-hatching in certain portions of the image on sheet S represents color patches of one color, while the lighter cross-hatching is intended to represent a color patch of a different color. It will be noted that the sequence of color patches are aligned along a single axis and that, comparing the original data to the resulting color patches on the sheet S, the relatively darker patches correspond to the 1's in the data stream while the lighter areas correspond to 0's in the data stream. There is thus a one-to-one relationship between a stream of binary data desired to be rendered and the specific color of color patches formed along the axis on the sheet.

It is important that the color patches be aligned along a axis, or at least follow some other organizing principle, because the important information rendered in the color patches derives from the relative order of 1's and 0's. Different colors can be assigned, as desired, to represent either 1's or 0's in the data as desired for a particular application.

Figure 2:
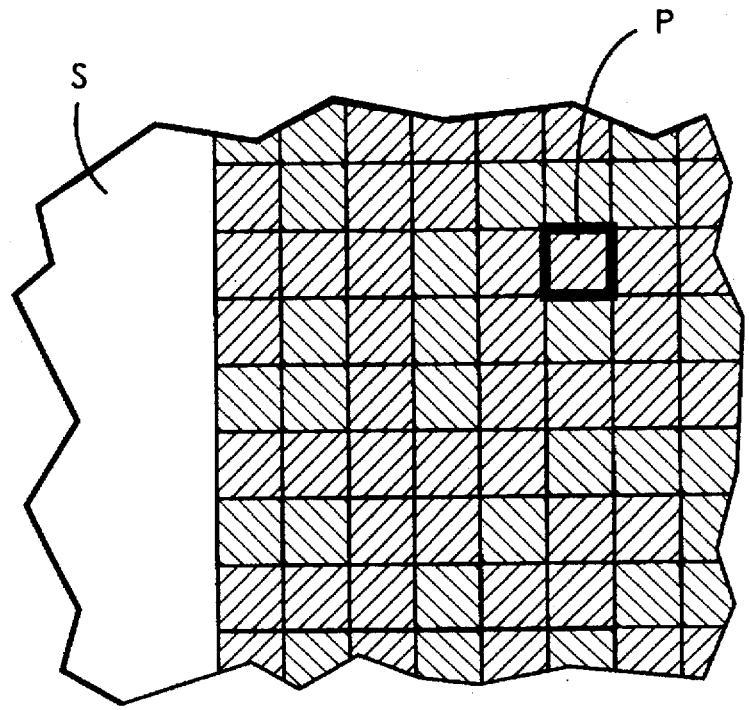
FIG. 2 is an example of a set of data glyphs formed on a surface.

FIG. 2 shows an example set of color patches representing binary data when a series of axes of color patches are printed contiguously on a sheet S. As shown, the color patches are intended to take up only a portion of the illustrated portion of the sheet S. As can be seen, different patches of different colors together form a larger generally-colored area. At a typical small scale in which practical printing and reading of such color patches is possible, such a combination of color patches of different colors may to a casual observer optically blend into a single hue. For example, assuming a printer with a resolution of 300 spots per linear inch, each individual color patch, such as singled out as P in FIG. 2, may have a dimension of 5×5 pixels, making each color patch $\frac{1}{60}$" on each side. When a large number of such relatively small color patches are printed in contiguous fashion as shown, it is likely that the casual optical effect will be that of a reasonably homogeneously-colored area, which only relatively close optical scrutiny will reveal to comprise patches of two different colors, blended together.

Figure 3:
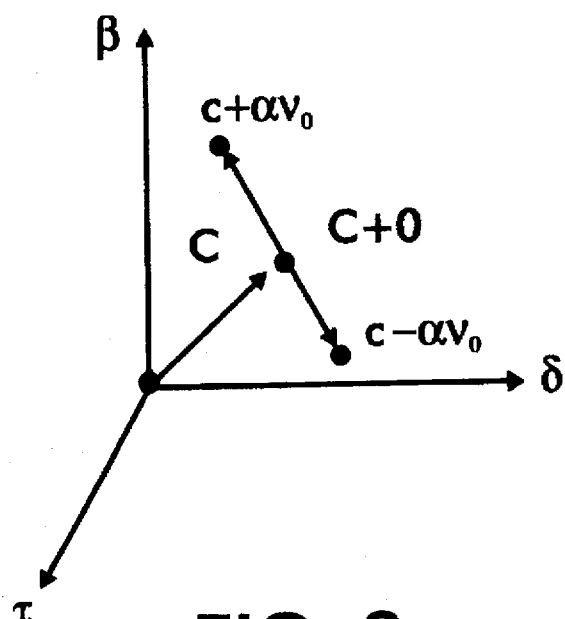
FIG. 3 is an illustration of the location of colors of test patches in an r, g, b color space, illustrating a principle of the preferred embodiment of the present invention.

As is well known, any particular color or hue which can be printed can be expressed in terms of a combination of different amounts of three combined primary colors. In printing color images, the primary colors are typically subtractive primary colors such as magenta, yellow, and cyan; for machine sensing of colors, the primary colors are typically additive primary colors such as red, green, and blue. For the present example, it is assumed that any particular color printed by a color digital printer will include red, green, and blue components to various extents, as would be detected by digital scanning equipment. FIG. 3 shows an example three-dimensional color space with the three subtractive primary colors blue, green, and red represented by axes in three-dimensional space: as is well-known, the farther from the origin one moves along a particular axis the more of that particular primary color will be apparent. Also shown in this color space is a vector representing a particular color c. As can be seen from the graph, color c is derived from a combination of a plurality of primary colors. The location in color space of color c is shown to lie on a particular vector of a certain length, and at either end of this vector are points in the color space which represent predetermined deviations from the basic color c. If the orientation of the vector is given as $v_0$, one end of vector $v_0$ can be expressed as $c+\alpha v_0$, while the other end of the vector $v_0$ can be expressed as $c-\alpha v_0$. The colors are aligned along vector $v_0$ so that the basic color c can be seen to represent an "average" of the two colors represented by $c+\alpha v_0$ and $c-\alpha v_0$.

In this way, going back to FIG. 2, a relatively large area of intermingled color patches for the first color and the second color will optically combine to appear, from a distance, to be a single third color. In this example, if the first color test patches in FIG. 2 are of the color represented by $c+\alpha v_0$, and the second color patches are of a color represented by $c-\alpha v_0$, the two sets of color patches will optically blend together to a casual observer, and appear to be color $c+0$, or just c.

It is desirable that the two colors of the color patches be roughly equidistant in color space from the desired average color c. It is further desirable that the relationship of the two colors, expressed as the orientation of the vector $v_0$ and the distance of the scalar $\alpha$, be always constant when rendering binary data, regardless of the specific location in color space of the desired average color c. That is, various esthetic considerations going to the overall look of the image to be printed may mandate that a particular area be colored red, green, or whatever; the absolute value of the average color c in color space is preferably immaterial, and can be chosen from almost the entire color space of which the printer is capable. More important is that the two colors which are derived from the desired average color c always be of the same relationship to each other, such as by being oriented along the same vector direction of $v_0$, and always separated from the average color c by the same scalar $\alpha$. Thus, no matter where one wishes to place the average color c in the color space, the desired separation of first colors and second colors can be accomplished. Also, the value of the scalar c z should be sufficient for photosensitive equipment, such as a scanner, to be able to distinguish from the first color and the second color readily at the necessary resolution.

In the choice of orientation of the vector $v_0$ and the extent of the scalar $\alpha$, it is desirable to balance the accuracy and sensitivity of the printer and scanner hardware being used with the sensitivity of the human eye. It is desirable to have the deviation between the two colors to be maximally detectable by a scanner and minimally detectable by the human eye. Ideally, the average color rendered on the page, and visible to the human eye, should be deemed merely the carrier of information, and the color deviations of neighboring color patches being a modulation of the carrier.

In practical embodiments of the present invention, it may be desirable to select the orientation of vector $v_0$ and/or the scalar $\alpha$ based on the absolute value of the desired average color c. Different average colors c may be reproduced or detected with different peculiarities or common errors when printed or scanned on certain types of equipment. For example, given a certain set of printing and/or scanning equipment, the rendering of the precisely desired amount of yellow is difficult to obtain; in such a case, the lack of accuracy in printing or detecting yellow could be compensated for by using a value of a which increases depending on the amount of yellow in the average color c. In this way, the large difference in color-space among color patches (caused by the large $\alpha$) compensates for the lack of optical acuity in detecting yellow. For colors which are relatively easy for the scanner to discriminate, such as red, a smaller value of c t will suffice, and a smaller c z will be less conspicuous in a printed document.

The color space relationship in FIG. 3 represents a binary coding system. This binary coding system can be generalized into an N-ary system by providing, intersecting the desired average color c, a plurality of vectors $v_0$, $v_1$, $v_2$ ... extending each in a different direction along some scalar a from the average color c. Of course, complicated N-ary systems will require relatively demanding color resolution of input scanning equipment.

Figure 4:
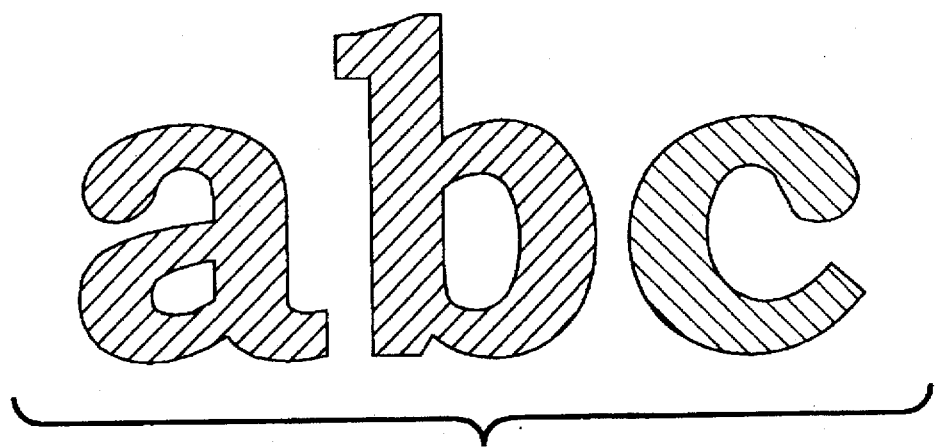
FIG. 4 is an example of incorporating color data glyphs according to the present invention within alphanumeric characters.

As shown in FIG. 1, the different color patches are preferably in the form of contiguous squares, but is also possibly desirable, for purposes of clarity, to separate individual color patches by small areas of blank space, or alternately make each color patch in the form of a discrete image, such as a round dot or even a small alphanumeric character, as shown in FIG. 4, where the different shading of each character represents a different color.

Figure 5:
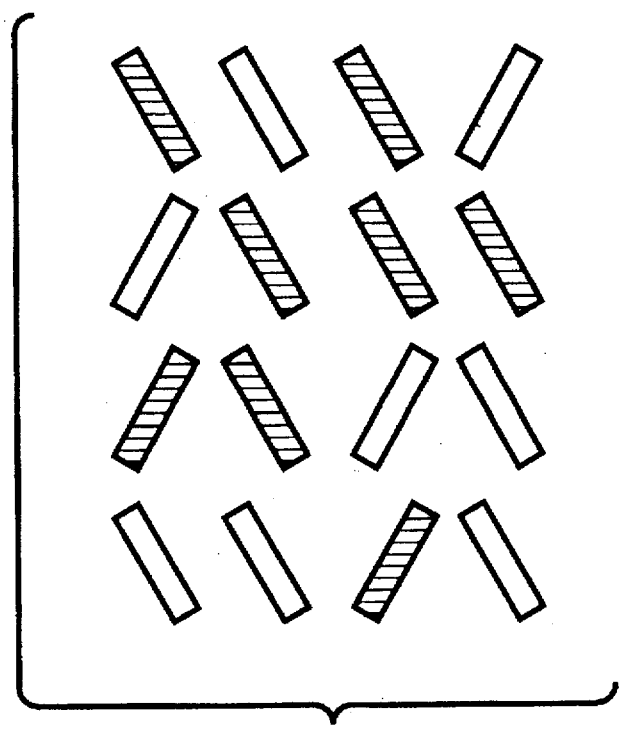
FIG. 5 is an example of incorporating the color data glyphs of the present invention within geometric-based data glyphs.

One could also print each individual color patch in the form of a geometric glyph, such as described in the patents referenced above, wherein the shape or linear orientation of each glyph determines whether it is assigned a 1 or 0 value, as shown in FIG. 5, where the different shading of each character represents a different color. It will be noted, by the shading of glyphs in FIG. 5, that the relative colors of neighboring glyphs are independent of the orientations of neighboring glyphs. Thus, the geometry-based glyphs can be used to render one set of data, while the relative colors of neighboring glyphs render another set of digital data. One advantage of combining the color-based glyphs of the present invention with geometry-based glyphs as described in the above-referenced patents is that one could create documents which provide two dimensions of digital data (both geometric-glyph data and color-glyph data) when the document is printed in color, but which sacrifice the color data, such as for security purposes, if the document is copied or printed on monochrome equipment.

In order to derive embedded binary data and the color glyphs according to the present invention, a reading program receiving scanned-in hard-copy data containing color glyphs can utilize the following basic steps to extract the desired binary information:

First, the scanned-in document, converted to digital pixel data, is analyzed for glyph-bearing data. Depending on a particular set-up, the equipment can be programmed to always place glyph-bearing images in a known area of the hard copy image. For example, if a large set of insurance forms are being processed electronically, the form itself may include glyph-bearing data in a predetermined location on the form which customers mail in. Alternately, the system could be made sensitive to particular average colors on scanned-in documents, signaling generally that they include glyph-bearing color patches therein.

Once the glyph-bearing portion of the original image is located, the average color c of the glyph-bearing portion of the image is determined, basically by averaging the color space values over a relatively large set of small areas on the surface corresponding to image pixels. Obviously, the average color of a greenish area will have a very high vector of green signals, and relatively small values of blue and red signals.

From this average value for a large portion of the glyph-bearing image area, once the average color c is determined, the colors of the first color patches and the second color patches can be determined arithmetically. In a preferred embodiment of the present invention, the scalar deviation of plus or minus c z is constant, along a vector $v_0$ of an orientation which is also constant for the system. Therefore, once the average color c is determined, the system can calculate where the pixels having the first color or the second color will appear in the color space.

The system polls the pixel data again, this time being sensitive to small patch-size concentrations of pixels which are of the predetermined relationship ($c+\alpha v_0$ or $c-\alpha v_0$) to the average color c. Significantly, the absolute value of the average color c in color space is immaterial: what matters is the local deviations from the average color c.

The pixels forming the glyph-bearing color space are then analyzed for local, patch-sized concentrations of pixels of the first color and concentrations of pixels of the second color, each respectively being assigned a binary value of 1 or 0 depending on the original parameters of the system. In this way, a stream of binary data can be isolated, and used as desired. Techniques for optically detecting individual color patches within a given area, and assigning meanings to those patches based on their positions within an area, are known in the art, particularly from known techniques relevant to geometric glyphs, as shown, for example, in the geometric glyph patents referenced above.

In choosing desirable dimensions for individual color patches, certain practical parameters must be taken into account. Most importantly, the patches should be of such a size as to be compatible with the expected resolution of scanning equipment which will read the color glyphs. If the color patches are too small relative to the resolution of the optical scanning equipment, there will obviously be a great deal of error: for example, if the optical scanning equipment has a resolution of 200 pixels per inch, feeding in a document having contiguous color patches spaced 300 to the inch will cause the photosensors in the optical scanner to very often receive light from two color patches simultaneously. The optical scanning equipment may not recognize that a photosensor (such as in a linear CCD) is looking at two color patches at a given moment, and not one; further, if one color patch being observed is of a first color and the other color patch being simultaneously observed is of the second color, the two color patches reflecting into a single photosensor will cause the individual colors to average out. Thus, in order to provide a robust system, the color patches should be printed in a manner which can minimize the opportunity for such errors at the optical scanning stage.

Figure 6:
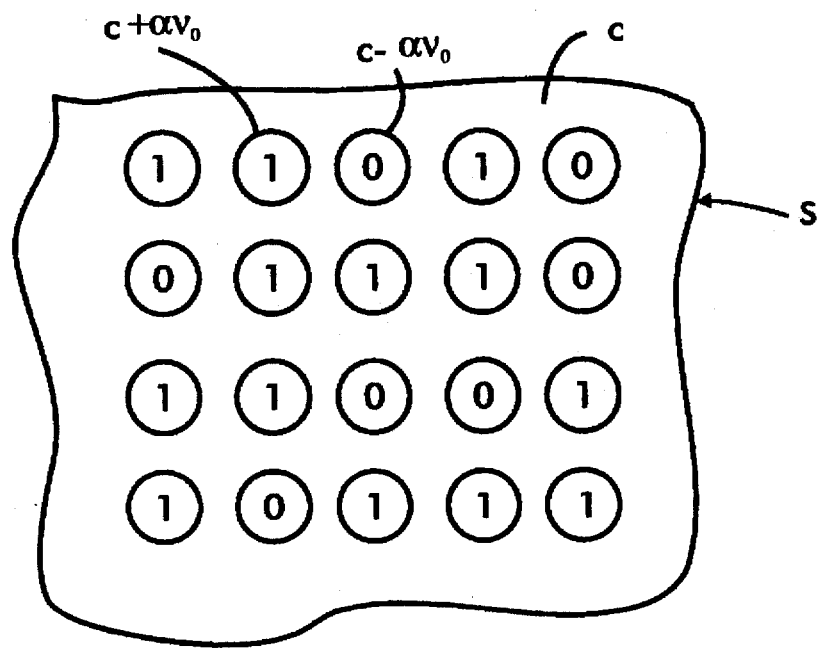
FIG. 6 shows a technique of printing color patches against a field of a color which is the average of the colors forming the information-bearing test patches.

One technique for minimizing such errors in the scanning stage is to space color patches of the first color or second color from each other, to minimize the chance that a single photosensor in an optical scanner will simultaneously view two color patches. As mentioned above, one technique for optically separating the color patches is to provide a reasonably large white space between the color patches. In order to maintain the desired inconspicuousness of color patches, however, the color patches of the first color or second color can be printed as "islands" in a field of the average color. An example of this technique is shown in FIG. 6: the individual information-bearing color patches, here shown as being of colors for either the 1-bits or 0-bits of binary data, are printed as round dots. The 1 color patches are of the color $c+\alpha v_0$, while the 0 color patches are of the color $c-\alpha v_0$. The various color patches are spaced widely apart to ensure that one individual photosensor in optical scanning equipment will have a low risk of viewing two patches simultaneously.

In order to better camouflage the widely-separated color patches, all of the color patches are printed on sheet S against a background of the average color c. The fact that a great deal of the surface area shown in FIG. 6 is of the average color c will tend to make the exact location in color space of the average color c more emphatic, by providing a larger statistical sample by which the average color c can be determined. With a more accurately-determined c, the locations in color space of the first color $c+\alpha v_0$ and second color $c-\alpha v_0$ can be more accurately calculated. The background printed in the average color c thus helps to make individual concentrations of pixels of the first color or the second color "stick out" more relative to the surrounding pixels, even as it camouflages the data-bearing glyphs to the casual observer.

It may be desirable that the amount of surface area on the sheet S on which the average color c is established be made as small as necessary for enabling the system to distinguish between the different types of color patches. Ideally, the arrangement shown in FIG. 6 could be embodied in a rendering of a color photograph: any area in the photograph of a minimum size of a uniform color could be used as the "carrier" area. A more sophisticated system could be able to identify local average colors within a complex color image, and then identify the information bearing patches within the local areas of average colors. In this way, a single document may include a number of different average colors in different areas. Alternately, a reading system may already have the underlying carrier data (such as of a color photograph) pre-stored in memory, and can just compare the data from a scanned-in document to derive the data-bearing color patches.

It is conceivable that the processes of creating and reading color-glyph-bearing "documents" according to the present invention could be performed without the steps of actually printing or detecting the glyphs on a substrate such as paper. That is, the present invention could be embodied in a system in which the "documents" are never physically printed but only ever appear on screens. Even if the documents are viewed only on screens and transmitted only as digital information over a network, many of the practical advantages afforded by the present invention will nonetheless be apparent.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method of creating a document bearing digital information on a surface, the digital information comprising bits in a first state and bits in a second state arranged in a predetermined relative order, comprising the steps of:

assigning each bit of the digital information to one of a set of small areas on the surface, the small areas being regularly spaced along an axis on the surface, the bits being assigned in the predetermined relative order to the small areas along the axis;

for each bit in the first state, printing a color patch of a first color in the assigned small area; and for each bit in the second state, printing a color patch of a second color in the assigned small area, the color patches being printed contiguously on the surface along the axis resulting in a region appearing to be substantially homogenously-colored to a casual observer.

2. The method of claim 1, wherein the digital information further comprises bits in a third to an Nth state, and further comprising the step of for each bit in each state of the third to Nth state, printing in the assigned small area a color patch of a unique color for each state.

3. A method of creating a document bearing digital information on a surface, the digital information comprising bits in a first state and bits in a second state arranged in a predetermined relative order, comprising the steps of:

assigning each bit of the digital information to one of a set of small areas on the surface, the small areas being regularly spaced along an axis on the surface, the bits being assigned in the predetermined relative order to the small areas along the axis;

for each bit in the first state, printing a color patch of a first color in the assigned small area;

for each bit in the second state, printing a color patch of a second color in the assigned small area; and printing on the surface a color patch of a third color, the third color being located in color space on a vector between the first color and the second color.

4. The method of claim 3, wherein the color patches of the first color and second color are printed as islands within a background of the third color.

5. The method of claim 3, further comprising the step of printing at least a subset of color patches in the shapes of geometric data glyphs.

6. The method of claim 3, further comprising the step of printing at least a subset of color patches as alphanumeric characters.

7. The method of claim 3, wherein the digital information further comprises bits in a third to an Nth state, and further comprising the step of for each bit in each state of the third to Nth state, printing in the assigned small area a color patch of a unique color for each state.

8. A method of reading a document bearing digital information on a surface, the digital information comprising color patches regularly spaced along an axis on the surface, the color patches comprising color patches of a first color and color patches of a second color, the first color patches and the second color patches being arranged along the axis in a predetermined relative order, comprising the steps of:

determining an average color of a large number of small areas on the surface;

calculating a location of the first color in color space, the first color being of a predetermined relationship in color space with the average color;

detecting, in the document, local concentrations of pixel areas of the first color;

calculating a location of the second color in color space, the second color being of a predetermined relationship in color space with the first color;

detecting, in the document, local concentrations of pixel areas of the second color; determining spatial relationships, in the document, of the local concentrations of pixel areas of the first color and the local concentrations of pixel areas of the second color; and deriving binary data from the spatial relationships of the local concentrations of pixel areas of the first color and the local concentrations of pixel areas of the second color.

\* \* \* \* \*